US005496470A

United States Patent [19]

Lenhart

[11] Patent Number: 5,496,470

[45] Date of Patent: Mar. 5, 1996

[54] MAGNETIC SEPARATOR

[75] Inventor: Thomas W. Lenhart, Rockton, Ill.

[73] Assignee: Barnes International, Inc., Rockford, Ill.

[21] Appl. No.: 250,002

[22] Filed: May 27, 1994

[51] Int. Cl.$^{6}$ .................................................. B01D 35/06

[52] U.S. Cl. ............................................ 210/222; 210/396

[58] Field of Search .................................... 210/222, 396; 209/219, 228, 229, 230

[56] References Cited

U.S. PATENT DOCUMENTS

| | | | |
|---|---|---|---|
| 4,110,218 | 8/1978 | Marriott et al. | 210/223 |
| 4,199,455 | 4/1980 | Estabrook | 210/223 |
| 4,686,035 | 8/1987 | Eastabrook | 210/137 |

FOREIGN PATENT DOCUMENTS

| | | | |
|---|---|---|---|
| 1156739 | 5/1985 | U.S.S.R. | 209/219 |

*Primary Examiner*—Matthew O. Savage

*Attorney, Agent, or Firm*—Leydig, Voit & Mayer Ltd.

[57] ABSTRACT

A separator with a continuously rotating magnetic drum which is partially disposed in a liquid flow path to attract and thereby separate magnetic particles from liquid delivered to the flow path. The separator includes an inclined scraper blade which removes the magnetic particles from the drum. The magnetic field of the drum penetrates the inclined scraper blade causing particles to build up on the blade, thereby allowing coolant which was carried with the particles on the drum to drain back to the flow path. A pushing force caused by particles subsequently delivered to the scraper blade by the rotating drum shoves the buildup of particles past the magnetic field acting on the scraper blade and down a discharge chute into a waste container. A magnetic shunt bar which is located in the rotating drum periodically interrupts the magnetic field acting on the scraper blade so that under conditions where the pushing force of the particles is diminished, the diminished pushing force is sufficient to shove the buildup of particles past the magnetic field and towards the discharge chute.

3 Claims, 1 Drawing Sheet

MAGNETIC SEPARATOR

BACKGROUND OF THE INVENTION

This invention relates generally to apparatus for separating particles from dirty liquid and more particularly to a magnetic separator of the type commonly used to clean machine tool coolant by magnetically removing entrained metal particles from the coolant.

In such a separator, dirty liquid is delivered to a flow path defined in part by a curved apron extending around the lower side of a rotatable drum, the drum having a generally magnetic outer shell. As the liquid flows to and around the drum, the particles are magnetically attracted to the drum and thus are removed from the liquid. The drum is slowly rotated to raise the collected particles out of the flow path and to enable the particles to be scraped from the drum and subsequently disposed of in a waste container.

The scraper has an inclined blade which is located in the magnetic field of the drum and which is disposed in contact with the outer shell of the drum at a position tending to create a dam causing coolant in the collected particles to drain back into the flow path and reduce the quantity of coolant carried to the waste container. A pushing force caused by particles subsequently delivered to the scraper by the rotating drum squeezes additional coolant from the buildup of particles at the inclined blade. Under most conditions, the pushing force from the subsequently delivered particles is sufficient to force the buildup of particles up the inclined scraper blade, through the magnetic field and toward a discharge chute. However, when the coolant is, for example, a heavy bodied oil, when the intrinsic magnetic attraction of the parties to the drum is low, or when the collected particles contain a large percentage of non-magnetic material, the pushing force is diminished and is insufficient to move the buildup of particles through the magnetic field which acts on the scraper blade. Under these conditions, some of the collected particles fall back into the flow path thereby reducing the efficiency of the separator.

SUMMARY OF THE INVENTION

The general aim of the present invention is to provide a new and improved magnetic separator by periodically relaxing the magnetic field acting on an inclined scraper blade which is removing magnetic particles from a rotating magnetic drum thereby enhancing efficiency of the separator under some operating conditions.

A more detailed objective is to achieve the foregoing by providing a low reluctance magnetic shunt bar in the rotating drum in order to effect relaxation of the magnetic field each time the shunt bar rotates past the scraper blade.

These and other objects and advantages of the invention will become more apparent from the following detailed description when taken in conjunction with the accompanying drawings.

Figure 1:
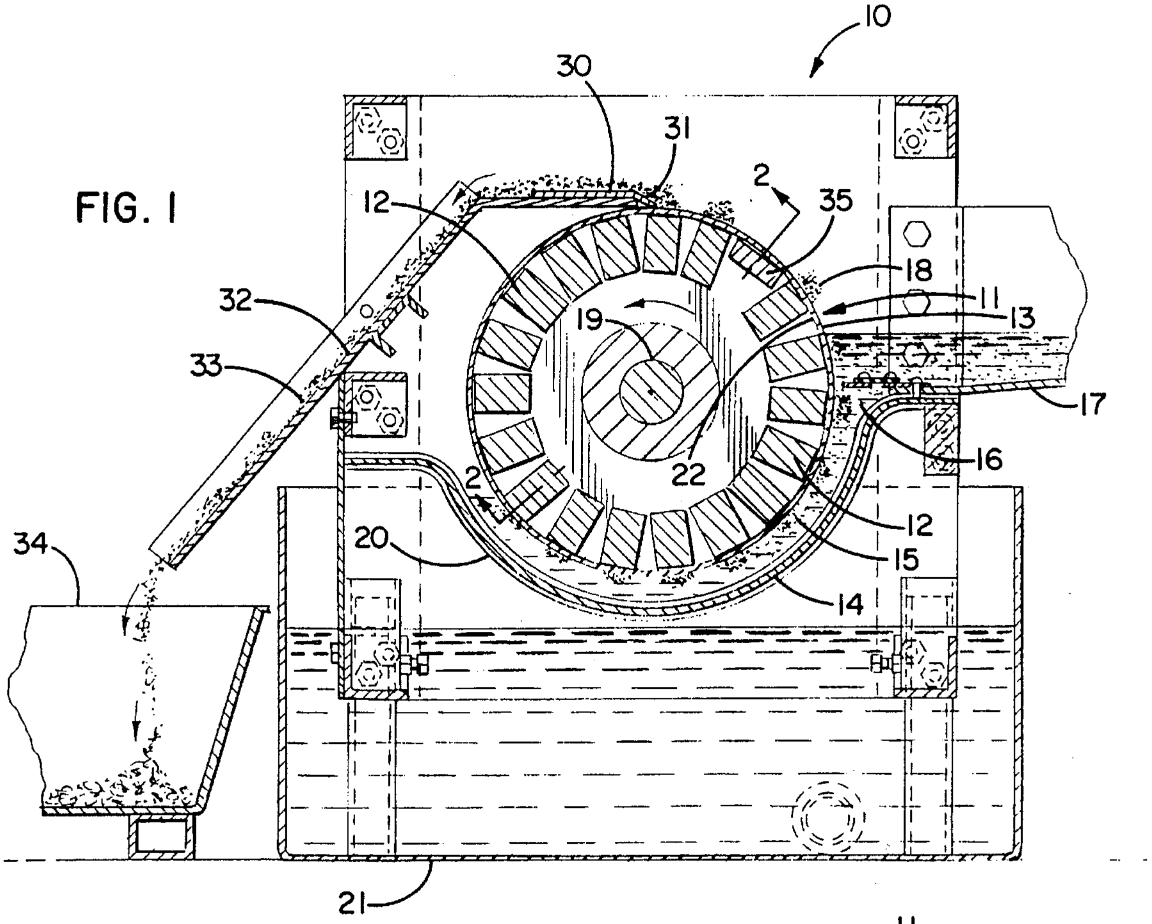
FIG. 1 is a fragmentary cross-sectional view of a new and improved magnetic drum separator incorporating the unique features of the present invention.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

As shown in the drawings for purposes of illustration, the invention is embodied in an apparatus for removing magnetic metal chips and particles from a flow of dirty liquid such as machine tool coolant circulated by a machine tool system. The particular apparatus which has been illustrated is a magnetic separator 10 (FIG. 1) having a generally cylindrical drum 11 adapted to be rotated in a counterclockwise direction about a horizontal axis, the interior of the drum carrying permanent magnets 12 which create a magnetic field around a major area of the outer shell 13 of the drum.

Located below the drum 11 is an apron 14 which coacts with the drum to define an arcuate flow path 15 for the coolant. The apron is in the form of a curved metal plate having a concavely curved upper surface concentric with and spaced outwardly from the drum. Dirty coolant from the machine tool system is delivered to the entry 16 of the arcuate flow path by way of a generally horizontal trough 17 and flows downwardly and clockwise around the drum. During such flow, the magnetic area of the outer shell 13 of the drum attracts magnetic chips and particles to separate them from the coolant and to form a cake of swarf 18 (i.e., a buildup of particles) on the drum. Non-magnetic particles may be also trapped in the swarf as the drum rotates. The drum is rotated continuously and at a relatively slow rate by means (not shown) connected to a center shaft 19 of the drum. As the drum rotates, the swarf is lifted out of the dirty coolant. Cleaned coolant spills over the discharge end 20 of the apron and into a clean coolant tank 21 for return to the machine tool system by means of a pump (not shown).

The permanent magnet sections 12 are generally cubic and are spaced axially along and circumferentially around the internal surface 22 of the shell 13 of the drum 11. Alternately, the magnetic sections could be longitudinally spaced rings or circumferentially spaced bars on the internal surface of the shell. The magnet sections are positioned so that like poles of adjacent magnets are facing each other.

Figure 2:
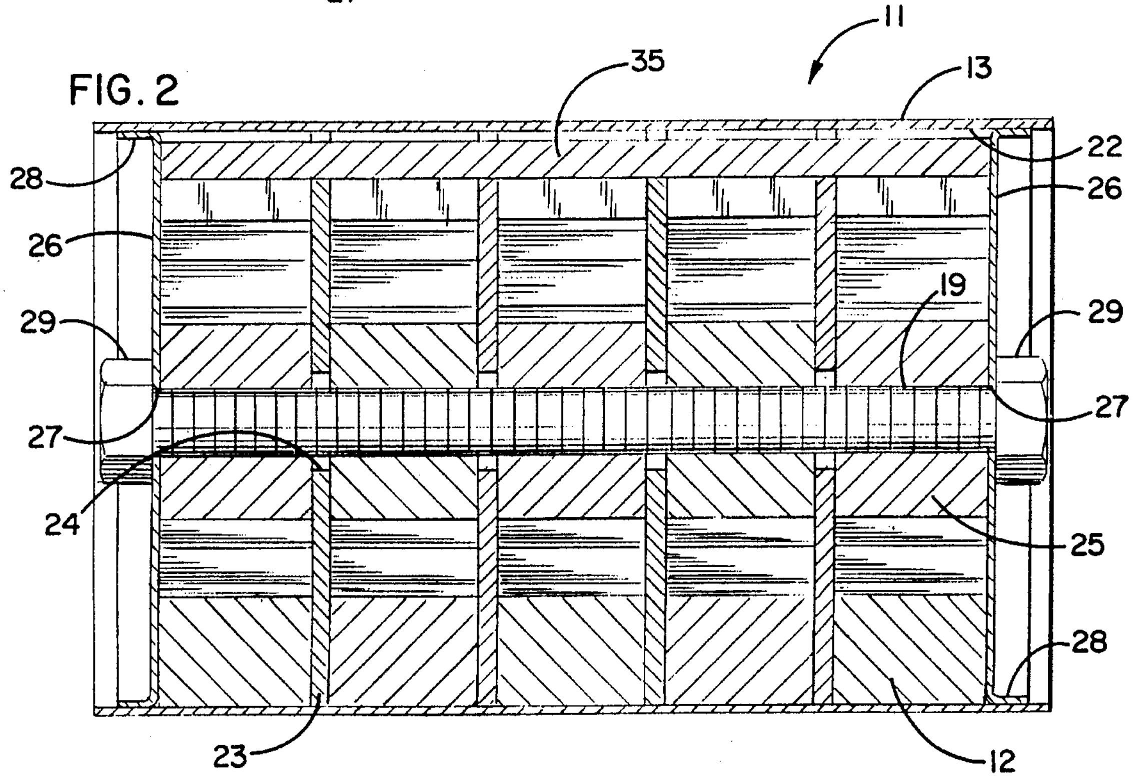
FIG. 2 is an enlarged cross-sectional view taken along the line 2—2 of FIG. 1.

The permanent magnet sections 12 (FIG. 2) are separated longitudinally by disc-shaped pole plates 23 each having a center opening 24 to receive the center shaft 19. The pole plates function to create a uniform magnetic field in the longitudinal direction along the drum 11. Spacers 25 are slidably located on the center shaft in order to separate and retain the pole plates in spaced relation near the axis of the drum.

The drum 11 is enclosed on its ends by covers 26 each having a center opening 27 which slidably receives an end of the center shaft 19. The covers are generally dish-shaped and Bach includes an annular rim 28, each cover being positioned on the center shaft so that the annular rim faces outwardly. Collars 29 are secured to the ends of the center shaft thereby retaining the covers on the shaft. The shell 13 of the drum is made of material having relatively high magnetic reluctance (e.g., stainless steel) and is suitably secured to the annular rims of the covers.

To remove the collected swarf 18 (FIG. 1) from the drum 11, a substantially horizontal scraper 30, located above the drum, has an inclined scraper blade 31 which is in contact with the drum. As the drum rotates, swarf is peeled away from the drum by the scraper blade. A pushing force caused by the supply of particles subsequently delivered to the scraper blade by the rotating drum shoves the swarf up the inclined blade and across the scraper. The discharge chute 32 is made from a low magnetic reluctance material which acts as a magnetic barrier. This barrier permits the pushing force to advance the swarf along the horizontal portion of the scraper and the discharge chute. The swarf then gravitates down an inclined portion 33 of the discharge chute and is collected in a waste container 34.

The inclined scraper blade 31 tends to create a dam causing coolant in the swarf 18 to drain back to the flow path 15, thereby reducing the amount of coolant that is carried to the waste container 34. To this end, the scraper blade is inclined downwardly and towards the direction of the oncoming swarf on the rotating drum 11 and is in contact with the outer shell 13 of the drum near the twelve o'clock position. The scraper 30 is formed from a high magnetic reluctance material (e.g., stainless steel) which permits the magnetic field generated by the permanent magnets 12 to penetrate the scraper blade. The magnetic field acting on the inclined scraper blade tends to retain the swarf on the blade, thereby permitting coolant to drain back into the flow path. The pushing force caused by the subsequently delivered particles further squeezes fluid from the buildup of swarf on the scraper blade.

Under most conditions, the pushing force from the subsequently delivered particles is sufficient to force the buildup of swarf 18 up the inclined scraper blade 31 and on toward the discharge chute 32. However, when the magnetic attraction or the coefficient of friction between the drum and the particles advancing on the drum is low, the pushing force is diminished and is insufficient to move the buildup of swarf through the magnetic field acting on the scraper blade. This reduced pushing force may occur, for example, when the coolant is a heavy bodied oil or when the swarf contains a large percentage of non-magnetic material. Under these conditions, excess particles fall back into the flow path thereby reducing the efficiency of the separator.

In accordance with the present invention, the magnetic separator 10 is uniquely constructed so that the rotating drum 11 periodically interrupts the magnetic field penetrating the scraper 30, thereby permitting the buildup of swarf 18 on the inclined scraper blade 31 to advance when the separator is operating in conditions that result in a diminished pushing force.

More specifically, a shunt bar 35 is located within the rotating drum 11 to reduce the magnetic field around a minor area of the drum. The shunt bar is made from a low magnetic reluctance material, preferably a low carbon steel, to effectively short circuit the magnetic field in that area. The shunt bar extends axially along the length of the drum (FIG. 2) and creates an arc of reduced magnetic flux around the shell 13 of the drum. The space occupied by the shunt bar is unoccupied by magnets 12 and, in the present instance, subtends an angle of approximately 20 degrees between circumferentially adjacent magnets.

Each time the shunt bar 35 (FIG. 1) rotates under the scraper 30, the magnetic field penetrating the scraper is temporarily interrupted. As this happens, the buildup of swarf 18 on the inclined scraper blade 31 is temporarily released from the magnetic field, thereby allowing a diminished pushing force to advance the swarf forwardly and toward the discharge chute 32 to a point at which the low magnetic reluctance of the discharge chute will shield the swarf from the attraction of the magnetic drum and allow it to migrate to the inclined portion of the discharge chute.

From the foregoing, it will be apparent that the present invention brings to the art a new and improved magnetic separator in which the collection of magnetic particles is enhanced over prior magnetic separators of the same general type by virtue of the provision of the shunt bar 35. The shunt bar is relatively inexpensive and enables periodic relaxation of the magnetic field in a comparatively economical manner.

I claim:

1. A magnetic separator for removing magnetic particles from liquid, said separator comprising a housing containing liquid contaminated with magnetic particles, a generally cylindrical drum rotatably supported by said housing and having an outer shell partially disposed in said liquid, means for creating a constant magnetic field around a major and fixed exterior area of said shell whereby said major and fixed exterior area of said shell attracts and collects magnetic particles in said liquid as said drum and shell are rotated, a scraper blade located outside of said liquid and contacting said shell to remove collected magnetic particles from said shell as said particles rotate into engagement with said blade, a discharge chute located adjacent said blade whereby particles scraped from said shell by said blade are pushed onto said chute by subsequently scraped particles, and means made of low magnetic reluctance material located within said drum and joined to said shell for constantly reducing said magnetic field around a minor and fixed exterior area of said shell whereby the magnetic attraction of particles to said scraper blade is decreased each time said minor and fixed exterior area rotates past said blade thereby to facilitate the pushing of scraped particles onto said chute.

2. A magnetic separator for removing magnetic particles from liquid, said separator comprising a housing containing liquid contaminated with magnetic particles, a generally cylindrical drum rotatably supported by said housing and having an outer shell partially disposed in said liquid, a plurality of permanent magnets located within said drum, said magnets being spaced substantially around the inner circumference of said shell and extending axially of the shell, said magnets acting to create a magnetic field around a major and fixed exterior area of said shell whereby said major area of said shell attracts and collects magnetic particles in said liquid as said drum and said shell are rotated, a scraper blade located outside of said liquid and contacting said shell to remove collected magnetic particles from said shell as said particles rotate into engagement with said blade, a discharge chute located adjacent said blade whereby particles scraped from said shell by said blade are pushed onto said chute by subsequently scraped particles, there being a space within said drum and adjacent the inner circumference of said shell, said space extending both axially and circumferentially of said shell and being unoccupied by magnets, and a shunt bar of low magnetic reluctance material located in said space and joined to said shell, said shunt bar reducing said magnetic field around a minor and fixed exterior area of said shell located outwardly of and generally overlying said space whereby the magnetic attraction of particles to said scraper blade is decreased each time said minor and fixed exterior area rotates past said blade thereby facilitating the pushing of scraped particles onto said chute.

3. A magnetic separator for removing magnetic particles from liquid, said separator comprising a rotatable drum having a generally cylindrical outer shell partially immersed in said liquid, means for creating a constant magnetic field around a major and fixed exterior area of said shell whereby said major and fixed exterior area of said shell attracts and collects magnetic particles in said liquid as said drum and said shell are rotated, a scraper blade located outside of said liquid and contacting said shell to remove collected magnetic particles from said shell as said particles rotate into engagement with said blade, magnetic particles being attracted to said blade by said magnetic field and tending to be retained by said blade so that particles subsequently rotating toward engagement with said blade squeeze liquid from the retained particles, and means made of low magnetic reluctance material located within said drum and joined to said shell for constantly reducing said magnetic field around a minor and fixed exterior area of said shell whereby the magnetic attraction of particles to said scraper blade is reduced each time said minor and fixed exterior area rotates past said blade thereby to periodically enable particles scraped from said shell to push retained particles off of said blade.

* * * * *